(12) United States Patent
Saito et al.

(10) Patent No.: US 7,756,501 B2
(45) Date of Patent: Jul. 13, 2010

(54) MULTIPASS NOISE DETECTING APPARATUS AND FM RECEIVING APPARATUS

(75) Inventors: Yasuji Saito, Ota (JP); Masaya Suto, Maebashi (JP)

(73) Assignee: Sanyo Electric Co., Ltd., Osaka (JP)

( * ) Notice: Subject to any disclaimer, the term of this patent is extended or adjusted under 35 U.S.C. 154(b) by 636 days.

(21) Appl. No.: 11/767,381

(22) Filed: Jun. 22, 2007

(65) Prior Publication Data

US 2007/0298749 A1 Dec. 27, 2007

(30) Foreign Application Priority Data

Jun. 27, 2006 (JP) .............................. 2006-176713

(51) Int. Cl.
H04B 1/10 (2006.01)
H04B 1/18 (2006.01)

(52) U.S. Cl. ..................... 455/303; 455/226.1; 455/225; 455/284

(58) Field of Classification Search ................. 455/506, 455/65, 63.1, 67.13, 135, 222, 277.2, 278.1, 455/283, 296, 303, 226.1, 225, 284

See application file for complete search history.

(56) References Cited

U.S. PATENT DOCUMENTS

| | | | | |
|---|---|---|---|---|
| 4,491,957 A | * | 1/1985 | Kamalski | 381/13 |
| 6,173,166 B1 | * | 1/2001 | Whitecar | 455/296 |
| 6,665,526 B2 | * | 12/2003 | Tsuji et al. | 455/296 |
| 6,725,027 B1 | * | 4/2004 | Tsuji et al. | 455/296 |
| 6,826,392 B2 | * | 11/2004 | Tsuji et al. | 455/296 |
| 7,447,284 B2 | * | 11/2008 | Raj et al. | 375/346 |
| 7,590,399 B2 | * | 9/2009 | Shatara et al. | 455/272 |
| 7,676,046 B1 | * | 3/2010 | Nelson et al. | 381/94.3 |

FOREIGN PATENT DOCUMENTS

| | | |
|---|---|---|
| JP | 02-283129 | 11/1990 |
| JP | 2001-036422 | 2/2001 |
| JP | 2005-277565 | 10/2005 |

* cited by examiner

*Primary Examiner*—Sonny Trinh
(74) *Attorney, Agent, or Firm*—SoCal IP Law Group LLP; Steven C. Sereboff; John E. Gunther (57) ABSTRACT

A multipass noise detecting apparatus comprising: a smoothing process unit configured to receive input of a signal corresponding to electric field strength of a received signal and to smooth the signal; a delay process unit configured to delay the signal; an amplifying unit configured to amplify a signal output from the smoothing process unit; a pulse noise determining unit configured to compare a signal output from the delay process unit with a signal output from the amplifying unit to output a pulse noise determining signal indicating a period of presence of pulse noise; and a noise cancel process unit configured to carry out a process for removing pulse noise on the basis of the pulse noise determining signal, the process being applied to the signal output from the delay process unit.

5 Claims, 10 Drawing Sheets

MULTIPASS NOISE DETECTING APPARATUS AND FM RECEIVING APPARATUS

CROSS-REFERENCE TO RELATED APPLICATION

This application claims the benefit of priority to Japanese Patent Application No. 2006-176713, filed Jun. 27, 2006, of which full contents are incorporated herein by reference.

BACKGROUND OF THE INVENTION

The present invention relates to a multipass noise detecting apparatus and an FM receiving apparatus, and relates to a technique that enables sure detection of only the multipass noise even if pulse noise is present.

DESCRIPTION OF THE RELATED ART

An FM receiving apparatus has a problem of multipass noise, which is the noise that is caused as electric waves are reflected by such obstacles as buildings and mountains. To deal with this problem, various conventional devices for removing multipass noise have been proposed.

Figure 7:
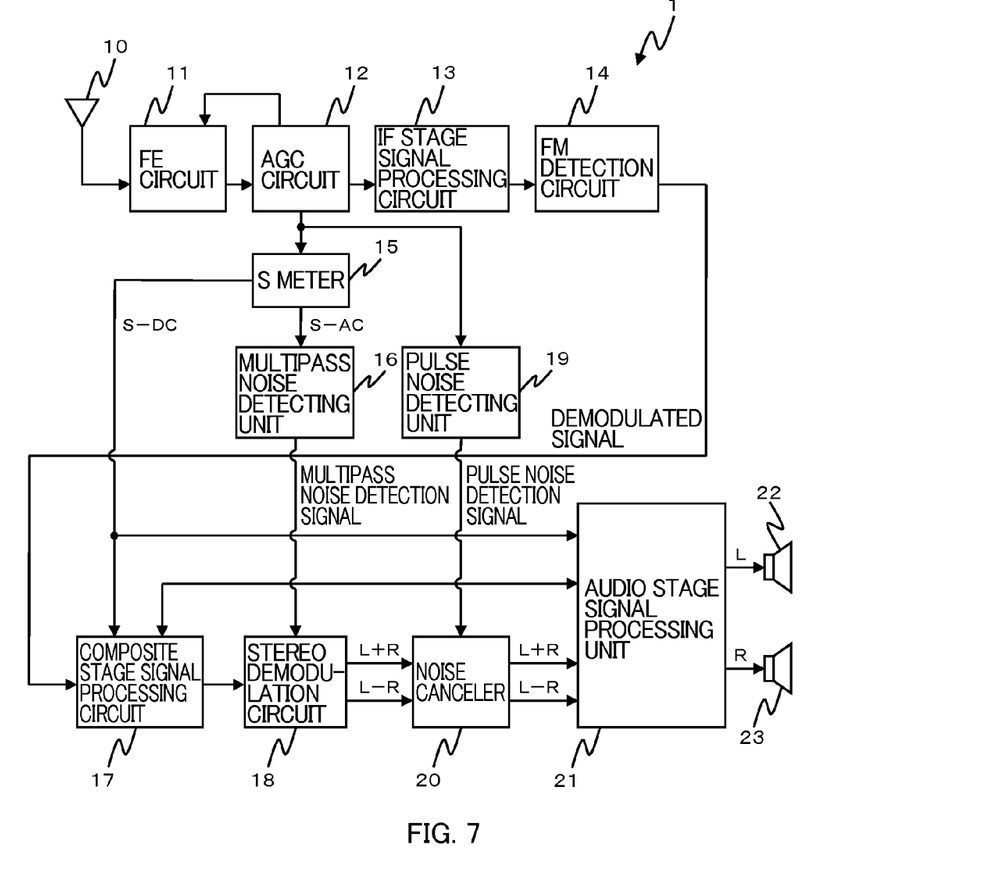
FIG. 7 is an example of the FM receiving apparatus 1 having a mechanism that removes multipass noise.

FIG. 7 depicts an example of an FM receiving apparatus 1 having a multipass noise removing function. The FM receiving apparatus 1 shown in FIG. 7 includes an antenna 10, a front end circuit 11 (FE circuit) that carries out tuning and high-frequency amplification of a received signal and converts the received signal into an intermediate frequency signal, an AGC (Automatic Gain Control) circuit 12 that controls an amplification gain of the front end circuit 11 according to the electric field strength of the intermediate frequency signal, an IF (Intermediate Frequency) stage signal processing circuit 13 that includes an amplification circuit amplifying the intermediate frequency signal and a limiter circuit, an FM detection circuit 14 that demodulates the intermediate frequency signal, an S meter 15 that outputs an AC (Alternating Current) signal (S-AC) and a DC (Direct Current) signal (S-DC) corresponding to the electric field strength of the intermediate frequency signal on the basis of the intermediate frequency signal output from the AGC circuit 12, a multipass noise detecting unit 16 that outputs a multipass noise detection signal indicating the presence/absence of multipass noise on the basis of the AC signal (S-AC), a composite stage signal processing circuit 17 that attenuates multipass noise contained in a demodulated signal output from the FM detection circuit 14, a stereo demodulation circuit 18 that generates a main channel signal (L+R) and a subchannel signal (L−R) from the demodulated signal, a pulse noise detecting unit 19 that outputs a pulse noise detection signal indicating the presence of such pulse noise as ignition noise and mirror noise contained in the intermediate frequency signal, a noise canceler 20 that removes pulse noise from the main channel signal (L+R) and the subchannel signal (L−R) on the basis of the pulse noise detection signal, and an audio stage signal processing circuit 21 that generates an L signal and an R signal from the main channel signal (L+R) and the subchannel signal (L−R).

The audio stage signal processing circuit 21 has an SP (Separation) process unit 211 that carries out a separation process of changing a degree of separation of the main channel signal from the subchannel signal on the basis of the DC signal (S-DC) output from the S meter 15 and the multipass noise detection signal output from the multipass noise detecting unit 16, and a high-cut (HC) process unit 212 that removes multipass noise by removing high-frequency components to improve an S/N (Signal-to-Noise) ratio.

Figure 8:
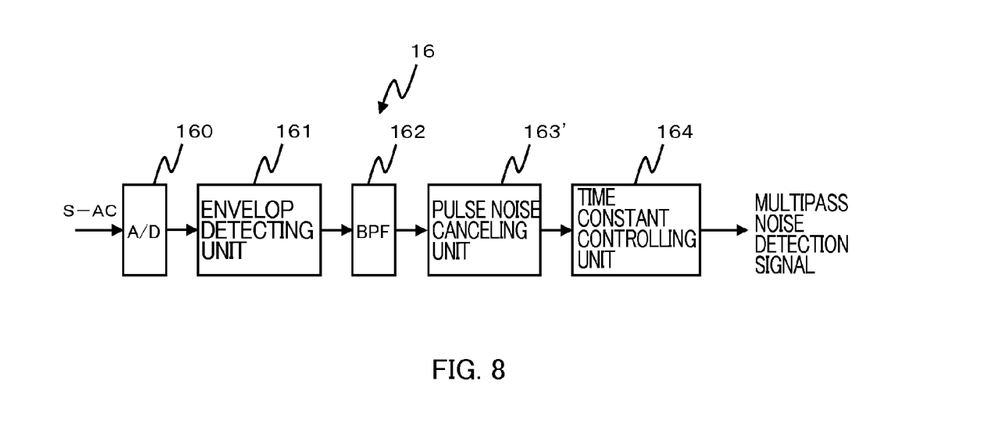
FIG. 8 is the configuration of the multipass noise detecting unit 16 in the FM receiving apparatus 1 shown in FIG. 7.

FIG. 8 depicts the configuration of the multipass noise detecting unit 16, which is realized using a DSP (Digital Signal Processor). The multipass noise detecting unit 16 includes an A/D converter 160 that converts an analog AC signal (S-AC) into a digital signal, an envelope detecting unit 161 that outputs a signal obtained by subjecting the digital signal output from the A/D converter 160 to envelope detection (hereinafter "envelope signal"), a band pass filter 162 that selects a signal in a frequency band corresponding to a noise component (including multipass noise and pulse noise) contained in the envelope signal, a pulse noise canceling unit 163' that carries out a process of canceling pulse noise, and a time constant controlling unit 164 that carries out time constant control on a signal output from the pulse noise canceling unit 163' (See Japanese Patent Application Laid-Open Publication Nos. 1990-283129, 2001-36422, and 2005-277565).

Figure 9:
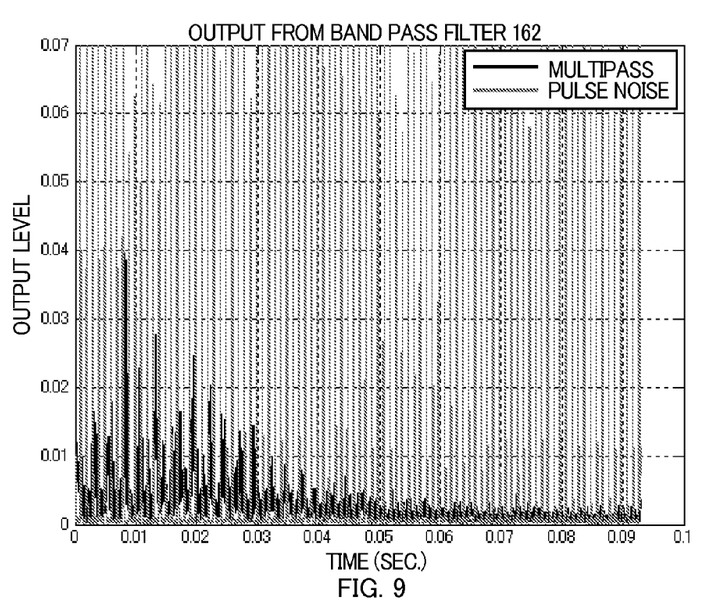
FIG. 9 is an example of a waveform output from the band pass filter 162.
Figure 10:
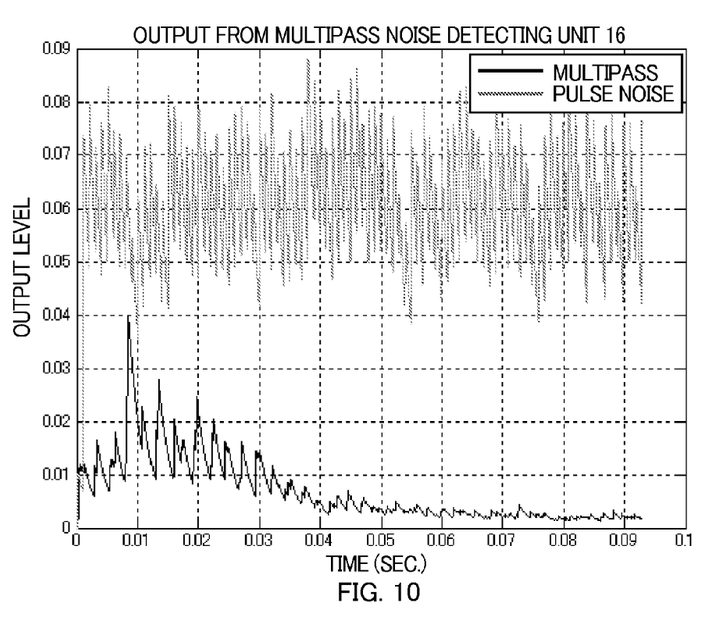
FIG. 10 is an example of a multipass noise detection signal output from the multipass noise detecting unit 16.

FIG. 9 is an example of the waveform of a signal that is output from the band pass filter 162 when an AC signal (S-AC) containing multipass noise and pulse noise is input to the multipass noise detecting unit 16. FIG. 10 is an example of the waveform of a multipass noise detection signal output from the time constant controlling unit 164. According to the configuration of the multipass noise detecting unit 16 as shown in FIG. 8, not only multipass noise but also pulse noise passes through the band pass filter 162, as shown in FIG. 9. As a result, the effect of pulse noise appears on the multipass noise detection signal output from the time constant controlling unit 164, as shown in FIG. 10.

Based on such a multipass noise detection signal containing the effect of pulse noise, a noise removal process is triggered also by pulse noise, which noise removal process include the multipass noise attenuation process on a demodulated signal by the composite stage signal processing circuit 17 and the separation process and high-cut process by the audio stage signal processing circuit 21. This leads to frequent execution of the noise removal process, which may heavily deteriorate the quality of a reproduced signal, such as reproduced sound, from the FM receiving apparatus 1.

SUMMARY OF THE INVENTION

A multipass noise detecting apparatus according to an aspect of the present invention, comprises: a smoothing process unit configured to receive input of a signal corresponding to electric field strength of a received signal and to smooth the signal; a delay process unit configured to delay the signal; an amplifying unit configured to amplify a signal output from the smoothing process unit; a pulse noise determining unit configured to compare a signal output from the delay process unit with a signal output from the amplifying unit to output a pulse noise determining signal indicating a period of presence of pulse noise; and a noise cancel process unit configured to carry out a process for removing pulse noise on the basis of the pulse noise determining signal, the process being applied to the signal output from the delay process unit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

It has been known that the pulse width of pulse noise is shorter than that of multipass noise. Because of this, the amplitude of pulse noise becomes greater than that of multipass noise when this noise is subjected to a smoothing process. A multipass noise detecting apparatus of the present invention utilizes an amplitude difference resulting from smoothing of pulse noise and multipass noise to distinguish pulse noise from multipass noise. Specifically, the multipass noise detecting apparatus of the present invention compares a signal resulting from pulse noise smoothing with a signal obtained by amplifying a signal resulting from multipass noise smoothing at a given amplification rate to generate a pulse noise determining signal that indicates a period of the presence of pulse noise, and generates a signal obtained by carrying out a pulse noise removal process on a signal output from a delay process unit on the basis of the pulse noise determining signal. A multipass noise detection signal is then generated based on the signal generated in the above manner, and the multipass noise detecting apparatus carries out a noise removal process based on the generated multipass noise detection signal. This prevents frequent execution of the noise removal process, thus preventing heavy deterioration of the quality of a reproduced signal.

Figure 1:
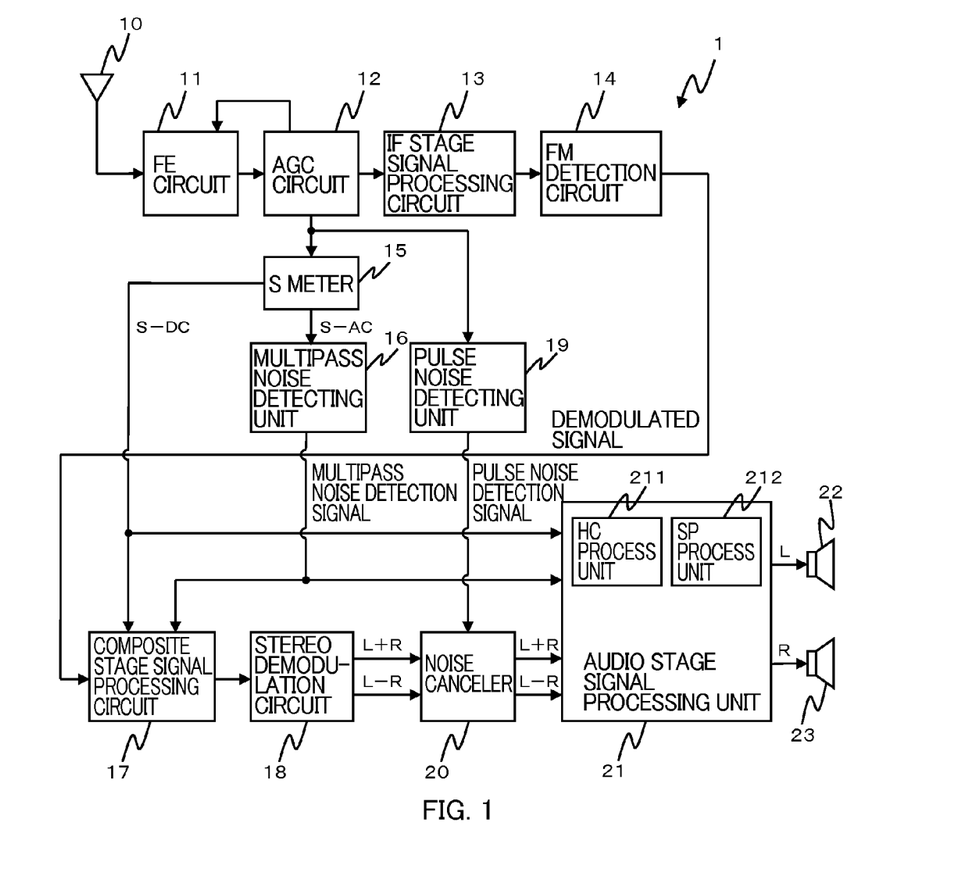
FIG. 1 is a diagram of the configuration of a FM receiving apparatus 1 according to one embodiment of the present invention.

One embodiment of the present invention will now be described in detail. FIG. 1 depicts the configuration of an FM receiving apparatus 1, which is explained as one embodiment of the present invention. The FM receiving apparatus 1 shown in FIG. 1 includes an antenna 10 that receives such electric waves as FM broadcasting radio waves, a front end circuit 11 (FE circuit) that carries out tuning and high-frequency amplification of a received signal and converts the received signal into a signal having an intermediate frequency (hereinafter "intermediate frequency signal"), an AGC (Automatic Gain Control) circuit 12 that controls a high-frequency amplification gain of the front end circuit 11 according to the electric field strength of the intermediate frequency signal, an IF (Intermediate Frequency) stage signal processing circuit 13 that includes an amplification circuit amplifying the intermediate frequency signal and a limiter circuit, an FM detection circuit 14 that demodulates the intermediate frequency signal, an S meter 15 that outputs an AC (S-AC) signal and a DC (S-DC) signal corresponding to the electric field strength of the intermediate frequency signal on the basis of the intermediate frequency signal output from the AGC circuit 12, a multipass noise detecting unit 16 (multipass noise detecting apparatus) that outputs a multipass noise detection signal indicating the presence/absence of multipass noise on the basis of the AC signal (S-AC), a composite stage signal processing circuit 17 that receives input of a demodulated signal, the multipass noise detection signal, and the DC signal (S-DC) and attenuates a part of the demodulated signal output from the FM detection circuit 14 that is in a period during which the demodulated signal contains multipass noise, a stereo demodulation circuit 18 that performs a matrix process on a signal output from the composite stage signal processing circuit 17 to generate a main channel signal (L+R) and a subchannel signal (L−R), a pulse noise detecting unit 19 that outputs a pulse noise detection signal indicating the presence of such pulse noise as ignition noise and mirror noise contained in the intermediate frequency signal output from the AGC circuit 12, a noise canceller 20 that removes pulse noise from the main channel signal (L+R) and the subchannel signal (L−R) output from the stereo demodulation circuit 18 on the basis of the pulse noise detection signal, and an audio stage signal processing circuit 21 that generates an L signal and an R signal from the main channel signal (L+R) and the subchannel signal (L−R).

The audio stage signal processing circuit 21 receives input of the DC signal (S-DC) output from the S meter 15 and the multipass noise detection signal output from the multipass noise detecting unit 16. The audio stage signal processing circuit 21 has an SP (Separation) process unit 211 that carries out a separation process of changing a degree of separation of the main channel signal from the subchannel signal on the basis of the above input signals, and an HC (High Cut) process unit 212 that carries out a high cut process of removing high-frequency components to improve an S/N (Signal-to-Noise) ratio.

Figure 2:
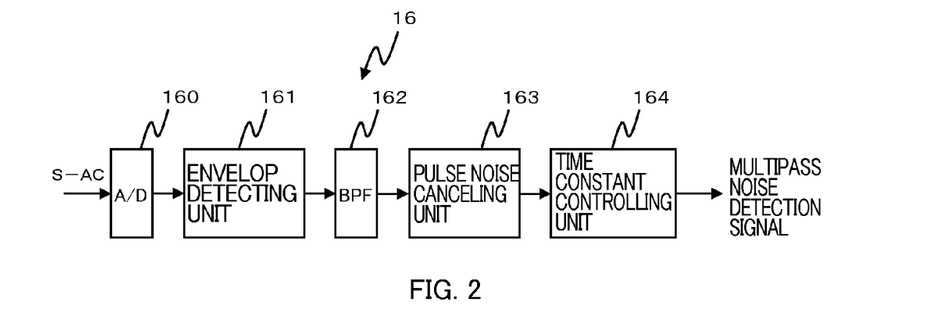
FIG. 2 is a diagram of the configuration of a multipass noise detecting unit 16 according to one embodiment of the present invention.

FIG. 2 depicts the configuration of the multipass noise detecting unit 16, which is realized using a DSP (Digital Signal Processor). The multipass noise detecting unit 16 includes an A/D converter 160 that converts an analog AC signal (S-AC) into a digital signal, an envelope detecting unit 161 that outputs a signal obtained by subjecting the digital signal output from the A/D converter 160 to envelope detection (hereinafter "envelope signal"), a band pass filter 162 that selects a signal in a frequency band corresponding to a noise component (including multipass noise and pulse noise) contained in the envelope signal, a pulse noise canceling unit 163, which will be described later, and a time constant controlling unit 164 that carries out time constant control on a signal output from the pulse noise canceling unit 163 to generate a multipass noise detection signal.

Figure 3A:
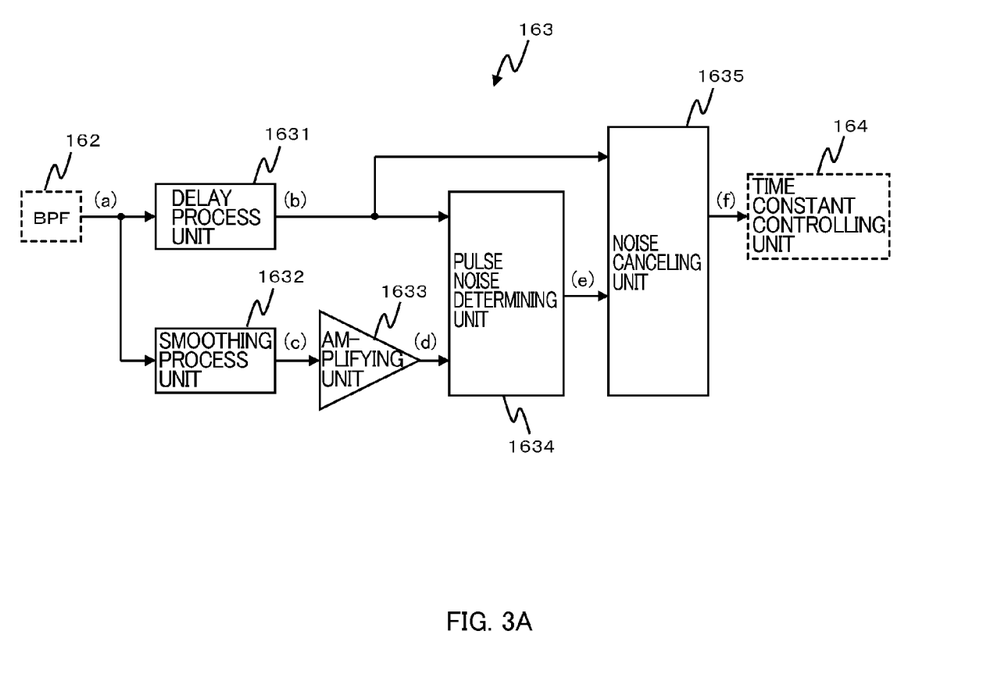
FIG. 3A is a diagram of the configuration of a pulse noise canceling unit 163 according to one embodiment of the present invention.

FIG. 3A depicts the configuration of the pulse noise canceling unit 163. The pulse noise canceling unit 163 includes a delay process unit 1631 that delays an envelop signal for a process time taken at a smoothing process unit 1632, which will be described later, the smoothing process unit 1632 that smoothes the envelope signal by calculating the moving average of the envelope signal, an amplifying unit 1633 that amplifies a signal output from the smoothing process unit 1632, a pulse noise determining unit 1634 that compares a signal output from the delay process unit 1631 with a signal output from the amplifying unit 1633 to generate a pulse noise determining signal, which takes a logical value indicating the presence of pulse noise in a period during which the signal output from the delay process unit 1631 is larger than the signal output from the amplifying unit 1633 and takes a logical value indicating the absence of pulse noise in a period other than the above period, and a noise cancel process unit 1635 that carries out a pulse noise removal process on the signal output from the delay process unit 1631 by interpolating the signal for a pulse noise presence period specified by the pulse noise determining signal on the basis of the waveform of the signal in a period before or after the pulse noise presence period. The above logical value indicating the presence of pulse noise is "1", and logical value indicating the absence of pulse noise is "0".

Figure 3B:
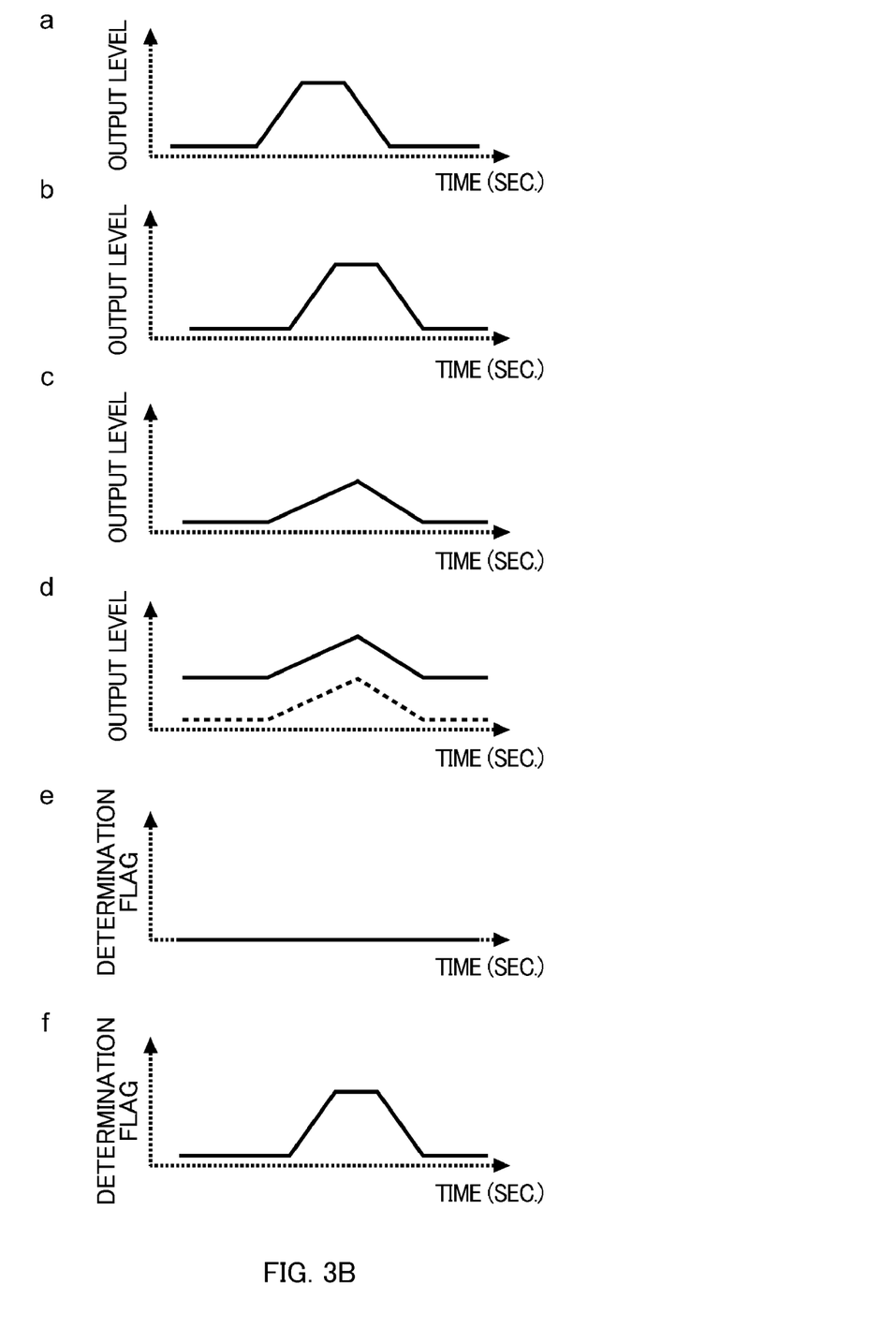
FIG. 3B is a diagrammatic view of the waveform of each signal that is output from each constituent unit of the pulse noise canceling unit 163 when an input signal to pulse noise canceling unit 163 does not contain pulse noise according to one embodiment of the present invention.
Figure 3C:
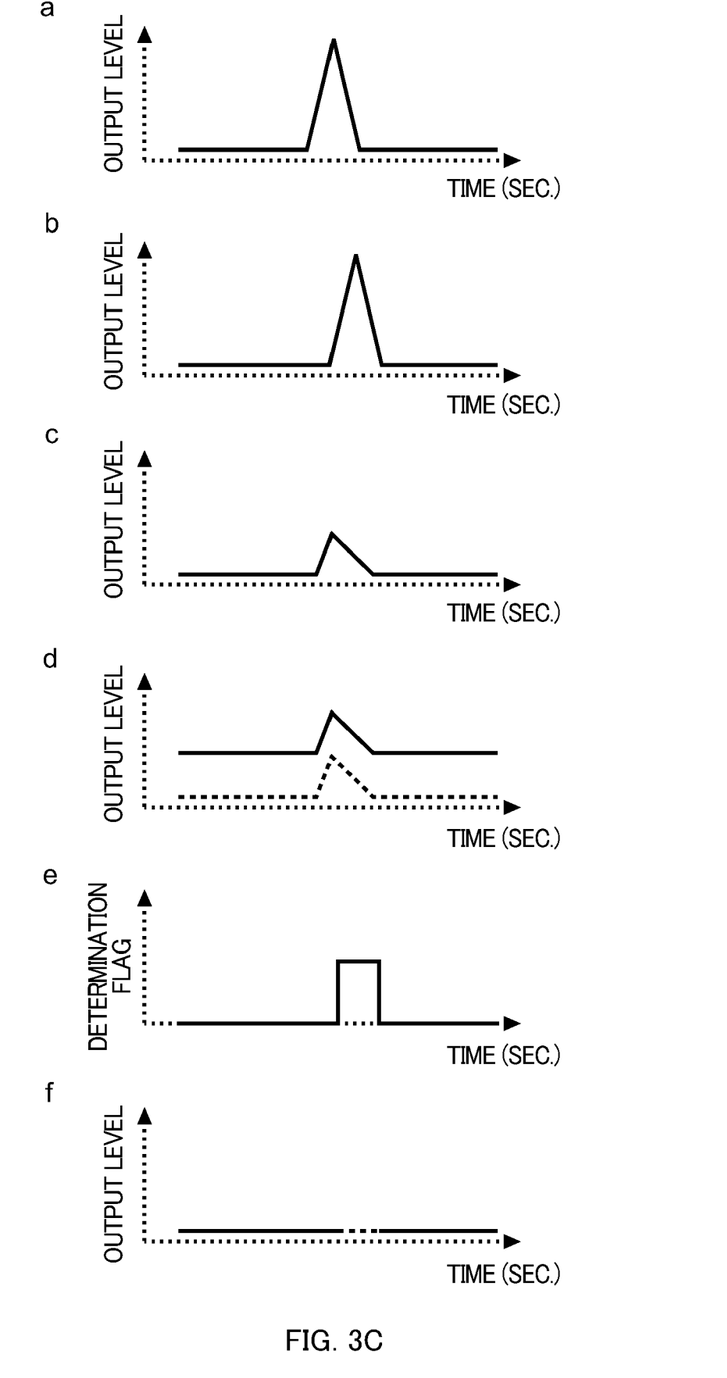
FIG. 3C is a diagrammatic view of the waveform of each signal that is output from each constituent unit of the pulse noise canceling unit 163 when an input signal to the pulse noise canceling unit 163 contains pulse noise according to one embodiment of the present invention.

The operation of the pulse noise canceling unit 163 shown in FIG. 3A will then be described in detail referring to FIGS. 3B and 3C. FIG. 3B is a diagrammatic view of the waveform of each signal that is output from each constituent unit of the pulse noise canceling unit 163 when a signal output from the band pass filter 162 does not contain pulse noise. In FIG. 3B, the waveform shown in (a) is the waveform of a signal output from the band pass filter 162 shown in FIG. 3A. The waveform shown in (b) is the waveform of a signal that is output from the delay process unit 1631 when the waveform shown in (a) is input to the delay process unit 1631, representing a waveform obtained by delaying the signal shown in (a) for the process time taken at the smoothing process unit 1632. The waveform shown in (c) is the waveform of a signal output from the smoothing process unit 1632, representing a waveform obtained by smoothing the signal shown in (a).

Out of the waveforms shown in (d), the waveform described by a continuous line is the waveform of a signal output from the amplifying unit 1633, representing a waveform obtained by amplifying the input waveform described by a broken line at a given amplifying rate. The waveform shown in (e) is the waveform of a signal output from the pulse noise determining unit 1634 (hereinafter "determination flag"). In the case as shown in 3B, the output level of the waveform show in (b) never exceeds the output level of the waveform shown in (d). The value (logical value) of the determination flag, therefore, is always "0". The waveform shown in (f) is the waveform of a signal output from the noise cancel process unit 1635. Since the value of the determination flag (logical value) is always "0", which is indicated by the waveform shown in (e), the noise cancel process unit 1635 performs no interpolation, thus outputs the waveform shown in (b) as it is.

FIG. 3C is a diagrammatic view of the waveform of each signal that is output from each constituent unit of the pulse noise canceling unit 163 when a signal output from the band pass filter 162 contains pulse noise. In FIG. 3C, the waveform shown in (a) is the waveform of a signal output from the band pass filter 162 shown in FIG. 3A. The waveform shown in (b) is the waveform of a signal that is output from the delay process unit 1631 when the waveform shown in (a) is input to the delay process unit 1631, representing a waveform obtained by delaying the signal shown in (a) for the process time taken at the smoothing process unit 1632. The waveform shown in (c) is the waveform of a signal output from the smoothing process unit 1632, representing a waveform obtained by smoothing the signal shown in (a).

Out of the waveforms shown in (d), the waveform described by a continuous line is the waveform of a signal output from the amplifying unit 1633, representing a waveform obtained by amplifying the input waveform described by a broken line at a given amplifying rate. The waveform shown in (e) is the waveform of a signal output from the pulse noise determining unit 1634 (hereinafter "determination flag"). In the case as shown in 3C, the value of the determination flag (logical value) is always "1" in a period during which the output level of the waveform show in (b) is equal to or larger than the output level of the waveform shown in (d). The waveform shown in (f) is the waveform of a signal output from the noise cancel process unit 1635. This waveform represents a waveform obtained by removing pulse noise from the waveform shown in (b), because, in the case of FIG. 3C, the noise cancel process unit 1635 performs interpolation in the period during which the value of the determination flag is "1".

<Description of Process>

Figure 4A:
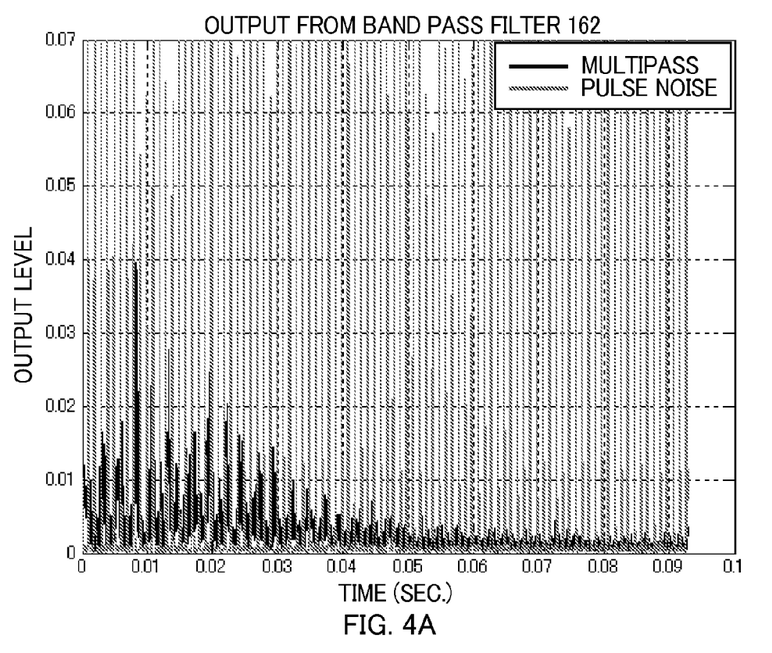
FIG. 4A is an example of a signal that is output from a band pass filter 162 when an AC signal (S-AC) is input to an envelope detecting unit 161 according to one embodiment of the present invention.
Figure 4B:
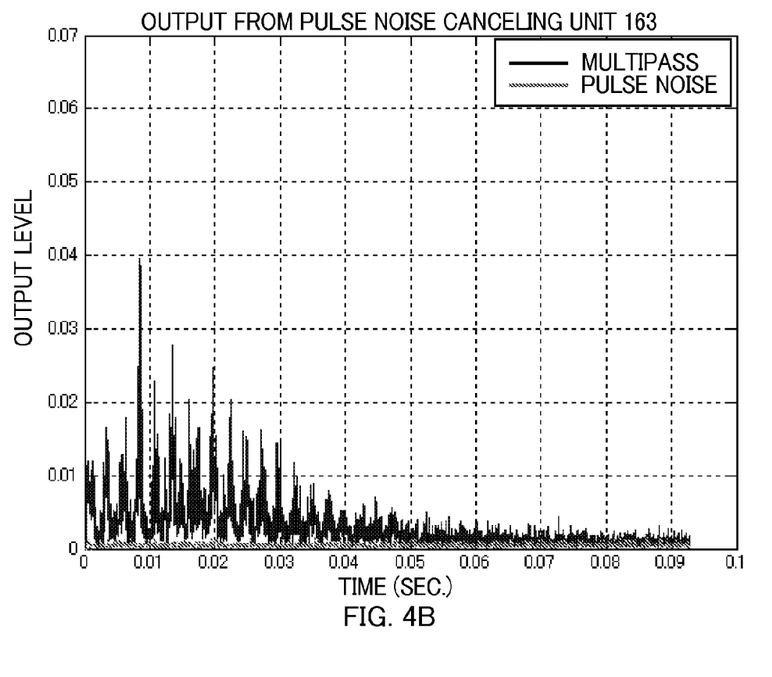
FIG. 4B is the waveform of a signal that is output from the pulse noise canceling unit 163 when the signal shown in FIG. 4A is input to the pulse noise canceling unit 163.
Figure 4C:
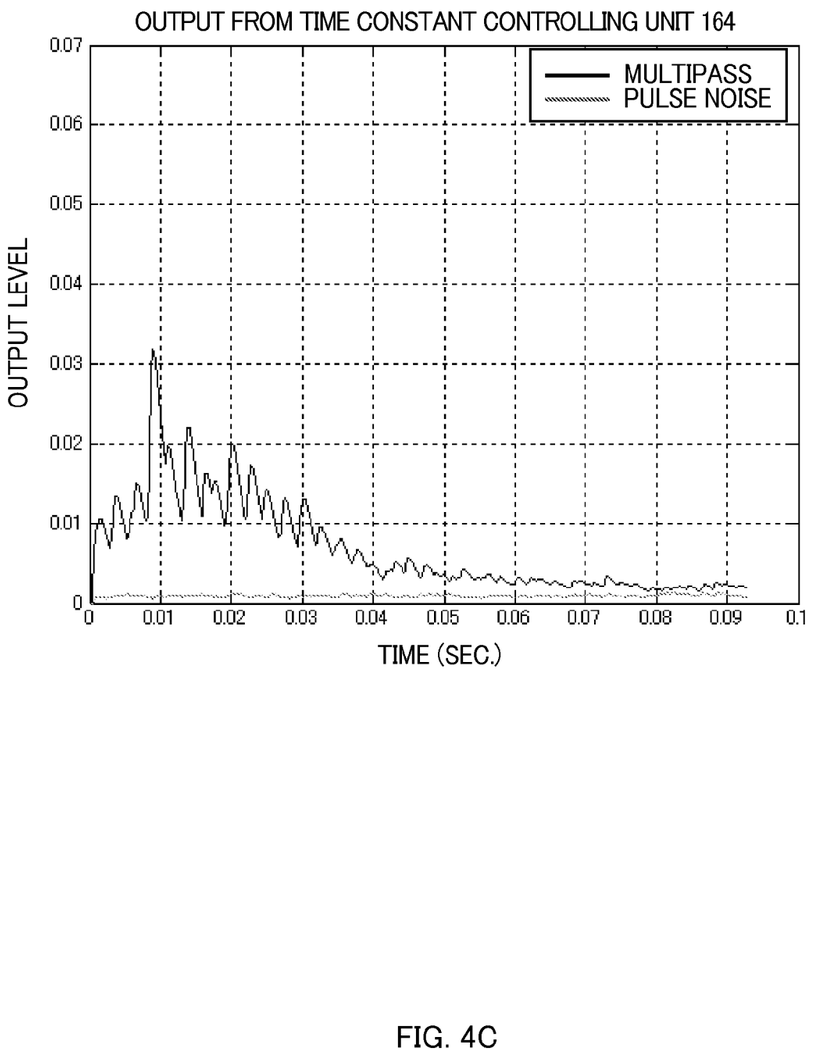
FIG. 4C is the waveform of a multipass noise detection signal that is output from a time constant controlling unit 164 when the signal shown in FIG. 4B is input to the time constant controlling unit 164.

A process executed by the multipass noise detecting unit 16 shown in FIG. 2 will then be described referring to waveform charts shown in FIGS. 4A to 4C.

FIG. 4A is an example of a signal that is output from the band pass filter 162 when an AC signal (S-AC) containing multipass noise or pulse noise is input to the envelope detecting unit 161.

FIG. 4B is the waveform of a signal that is output from the pulse noise canceling unit 163 when the signal shown in FIG. 4A is input to the pulse noise canceling unit 163. FIG. 4C is the waveform of a signal (multipass noise detection signal) that is output from the time constant controlling unit 164 when the signal shown in FIG. 4B is input to the time constant controlling unit 164. As shown in FIGS. 4A to 4C, pulse noise is attenuated by the pulse noise canceling unit 163. Multipass noise, on the other hand, shows nearly no difference in waveform between the output signal shown in 4A and the output signal shown in 4C.

Figure 5A:
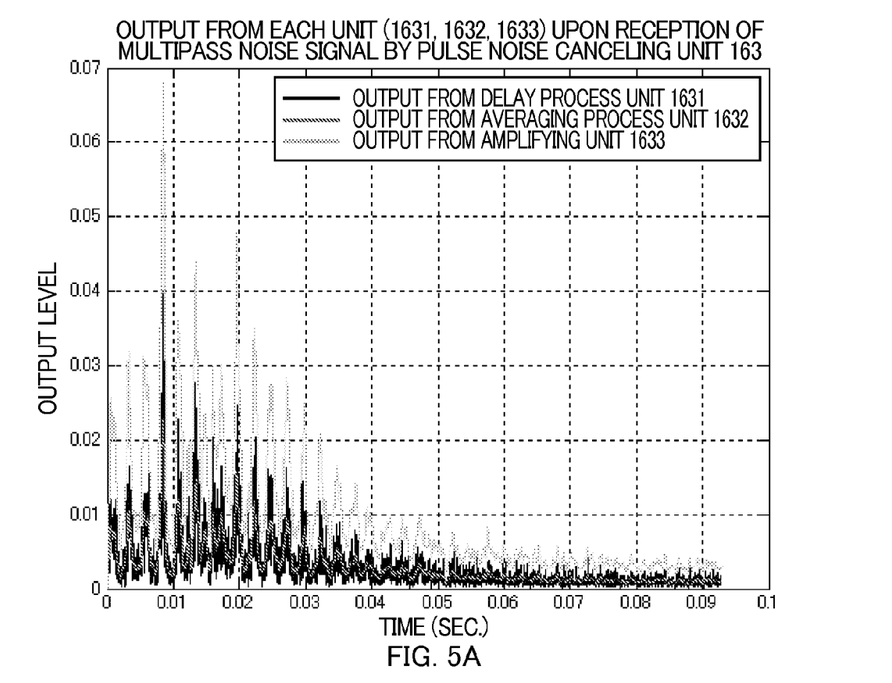
FIG. 5A is an example of signals which are output from a delay process unit 1631, a smoothing process unit 1632, and an amplifying unit 1633, respectively, when a signal containing only the multipass noise is input to the pulse noise canceling unit 163 according to one embodiment of the present invention.
Figure 5B:
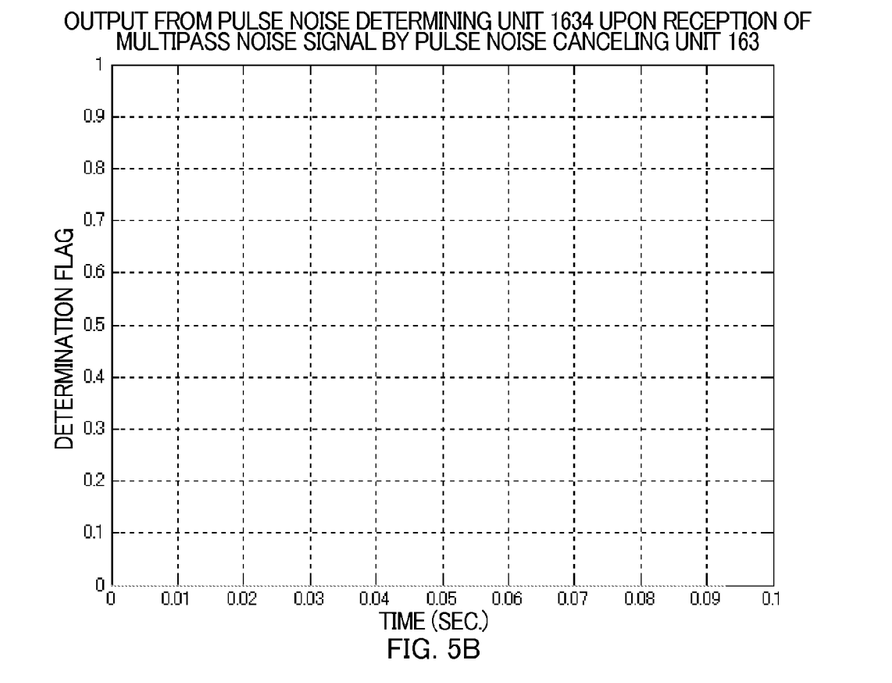
FIG. 5B is an example of a pulse noise determining signal that is output from a pulse noise determining unit 1634 when the signals shown in FIG. 5A are output from the delay process unit 1631, the smoothing process unit 1632, and the amplifying unit 1633, respectively.

FIG. 5A is an example of signals which are output from the delay process unit 1631, the smoothing process unit 1632, and the amplifying unit 1633, respectively, when a signal containing only the multipass noise is input to the pulse noise canceling unit 163. FIG. 5B is an example of a pulse noise determining signal that is output from the pulse noise determining unit 1634 when the signals shown in FIG. 5A are output from the delay process unit 1631, the smoothing process unit 1632, and the amplifying unit 1633, respectively. As shown in FIG. 5B, the pulse noise determining signal always becomes "0", i.e., the logical value indicating the absence of pulse noise even when a signal containing only the multipass noise is input to the pulse noise canceling unit 163.

Figure 6A:
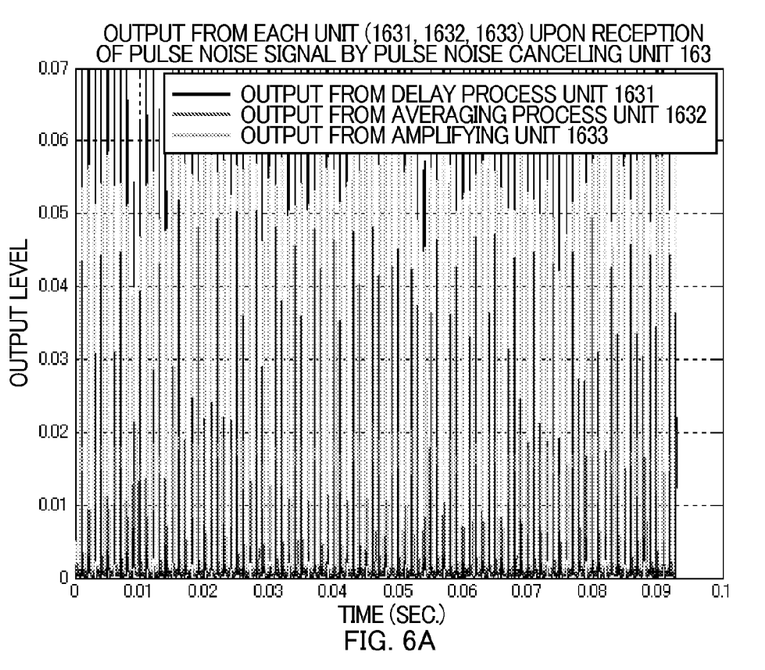
FIG. 6A is an example of signals which are output from the delay process unit 1631, the smoothing process unit 1632, and the amplifying unit 1633, respectively, when a signal containing only the pulse noise is input to the pulse noise canceling unit 163 according to one embodiment of the present invention.
Figure 6B:
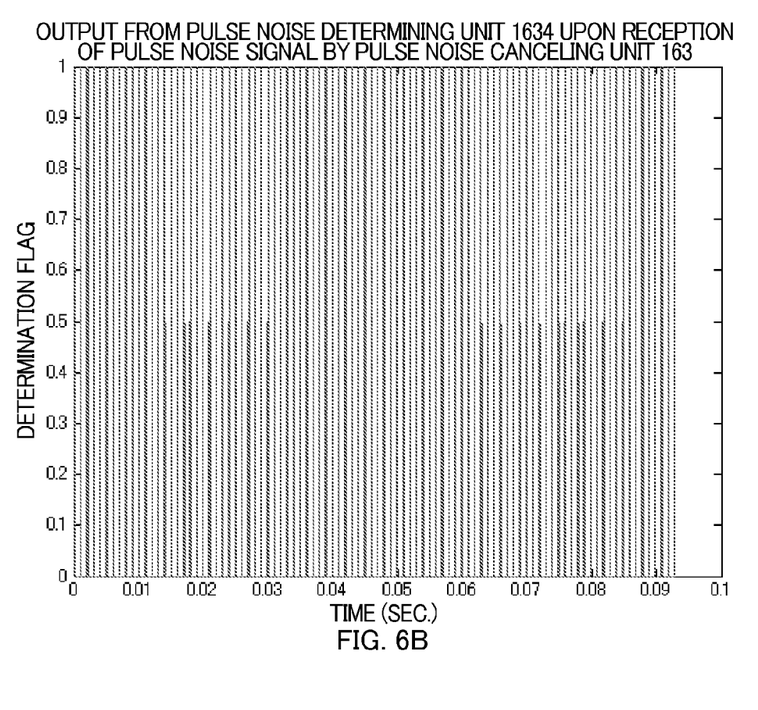
FIG. 6B is an example of a pulse noise determining signal that is output from the pulse noise determining unit 1634 when the signals shown in FIG. 6A are output from the delay process unit 1631, the smoothing process unit 1632, and the amplifying unit 1633, respectively.

FIG. 6A is an example of signals which are output from the delay process unit 1631, the smoothing process unit 1632, and the amplifying unit 1633, respectively, when a signal containing only the pulse noise is input to the pulse noise canceling unit 163. FIG. 6B is an example of a pulse noise determining signal that is output from the pulse noise determining unit 1634 when the signals shown in FIG. 6A are output from the delay process unit 1631, the smoothing process unit 1632, and the amplifying unit 1633, respectively. As shown in FIG. 6B, the pulse noise determining signal becomes "1", i.e., the logical value indicating the presence of pulse noise in a period of the presence of pulse noise when a signal containing only the pulse noise is input to the pulse noise canceling unit 163.

As described above, the pulse noise canceling unit 163 takes the logical value indicating the presence of pulse noise in a period of the presence of pulse noise, and takes the logical value indicating the absence of pulse noise in a period other than the period of the presence of pulse noise. A multipass noise detection signal output from the noise canceling unit 163 does not change even when multipass noise is present as long as pulse noise is not present. The noise cancel process unit 1635 performs an interpolation process for a period of the presence of pulse noise on the basis of a pulse noise determining signal, thus removing pulse noise. As a result, the pulse noise canceling unit 163 outputs a signal which contains only the multipass noise (FIG. 4B) as a result of removal of pulse noise.

The time constant control unit 164 carries out time constant control on the above signal output from the pulse noise canceling unit 163 to generate a multipass noise detection signal. This multipass noise detection signal is supplied to the composite stage signal processing circuit 17 and the audio stage signal processing circuit 21, where the multipass noise detection signal is used for various noise removal processes including the process of attenuating a signal in a period during which the signal contains multipass noise, which process is carried out by the composite stage signal processing circuit 17, and the separation process and high cut process carried out by the audio stage signal processing circuit 21.

The above embodiments of the present invention are simply for facilitating the understanding of the present invention and are not in any way to be construed as limiting the present invention. The present invention may variously be changed or altered without departing from its spirit and encompass equivalents thereof.

The above smoothing process unit 1632, for example, is able to have the same effect when being configured with a low-pass filter instead of moving average calculation.

It is claimed:

1. A multipass noise detecting apparatus comprising:
   a smoothing process unit configured to receive input of a signal corresponding to electric field strength of a received signal and to smooth the signal;
   a delay process unit configured to delay the signal;
   an amplifying unit configured to amplify a signal output from the smoothing process unit;
   a pulse noise determining unit configured to compare a signal output from the delay process unit with a signal output from the amplifying unit to output a pulse noise determining signal indicating a period of presence of pulse noise; and
   a noise cancel process unit configured to carry out a process for removing pulse noise on the basis of the pulse noise determining signal, the process being applied to the signal output from the delay process unit.

2. The multipass noise detecting apparatus of claim 1, wherein
   the smoothing process unit is configured to calculate a moving average of the signal corresponding to the electric field strength of the received signal to smooth the signal.

3. The multipass noise detecting apparatus of claim 1, wherein
   the smoothing process unit includes a low-pass filter smoothing the signal.

4. An FM receiving apparatus comprising:
   a front end circuit converting a received signal into an intermediate frequency signal;
   an IF stage signal processing circuit amplifying the intermediate frequency signal;
   an FM detection circuit demodulating the intermediate frequency signal;
   an S meter outputting a signal corresponding to electric field strength of the intermediate frequency signal;
   a multipass detecting unit outputting a multipass noise detection signal on the basis of the signal output from the S meter, the multipass noise detection signal indicating presence or absence of multipass noise; and
   a composite stage signal processing circuit attenuating multipass noise contained in a demodulated signal output from the FM detection circuit,
   the multipass detecting unit including:
      a smoothing process unit configured to smooth the signal output from the S meter;
      a delay process unit configured to delay the signal;
      an amplifying unit configured to amplify a signal output from the smoothing process unit;
      a pulse noise determining unit configured to compare a signal output from the delay process unit with a signal output from the amplifying unit to output a pulse noise determining signal indicating a period of presence of pulse noise; and
      a noise cancel process unit configured to carry out a process for removing pulse noise on the basis of the pulse noise determining signal, the process being applied to the signal output from the delay process unit.

5. The FM receiving apparatus of claim 4, further comprising:
   a stereo demodulation circuit configured to extract a main channel signal and a subchannel signal contained in the demodulated signal; and
   an audio stage signal processing circuit configured to generate an L signal and an R signal on the basis of the main channel signal and the subchannel signal,
   the audio stage signal processing circuit including at least one of a separation process unit and a high cut process unit, the separation process unit configured to change a degree of separation between the main channel signal and the subchannel signal, the high cut process unit configured to remove high-frequency component to improve S/N ratio.

* * * * *